USOO5344112A

United States Patent [19]

Peterson et al.

[11] Patent Number: 5,344,112
[45] Date of Patent: Sep. 6, 1994

[54] CANISTER BRACKET

[75] Inventors: Francis C. Peterson, Prescott, Wis.; Bipin Parekh, Plymouth, Mich.

[73] Assignee: Ford Motor Company, Dearborn, Mich.

[21] Appl. No.: 10,548

[22] Filed: Jan. 28, 1993

[51] Int. Cl.[5] .................................................. A47K 1/08
[52] U.S. Cl. ..................................... 248/313; 24/279; 24/339; 248/74.3; 248/316.5
[58] Field of Search .................. 248/313, 316.1, 316.5, 248/316.16, 231, 231.3, 231.5, 74.1, 74.2, 74.3; 24/573.1, 339, 279, 456

[56] References Cited

U.S. PATENT DOCUMENTS

| | | | |
|---|---|---|---|
| 3,602,960 | 9/1971 | Urbigkeit | 248/74.3 |
| 4,186,468 | 2/1980 | Zaniewski | 248/231 X |
| 4,802,646 | 2/1989 | Cattani | 248/316.5 |
| 4,934,644 | 6/1990 | Nagy et al. | 248/231 |
| 5,071,100 | 12/1991 | Sweeny | 248/313 |
| 5,098,054 | 3/1992 | Dyer | 248/313 |

FOREIGN PATENT DOCUMENTS 0603490  8/1960  Canada ........................... 248/313

Primary Examiner—Ramon O. Ramirez
Attorney, Agent, or Firm—Merchant, Gould, Smith, Edell, Welter & Schmidt

[57] ABSTRACT

A canister bracket for mounting a receiver/dryer in a vehicle which includes a ratchet closure for permitting trial assembly and placement of the receiver/dryer prior to final clamping.

1 Claim, 1 Drawing Sheet

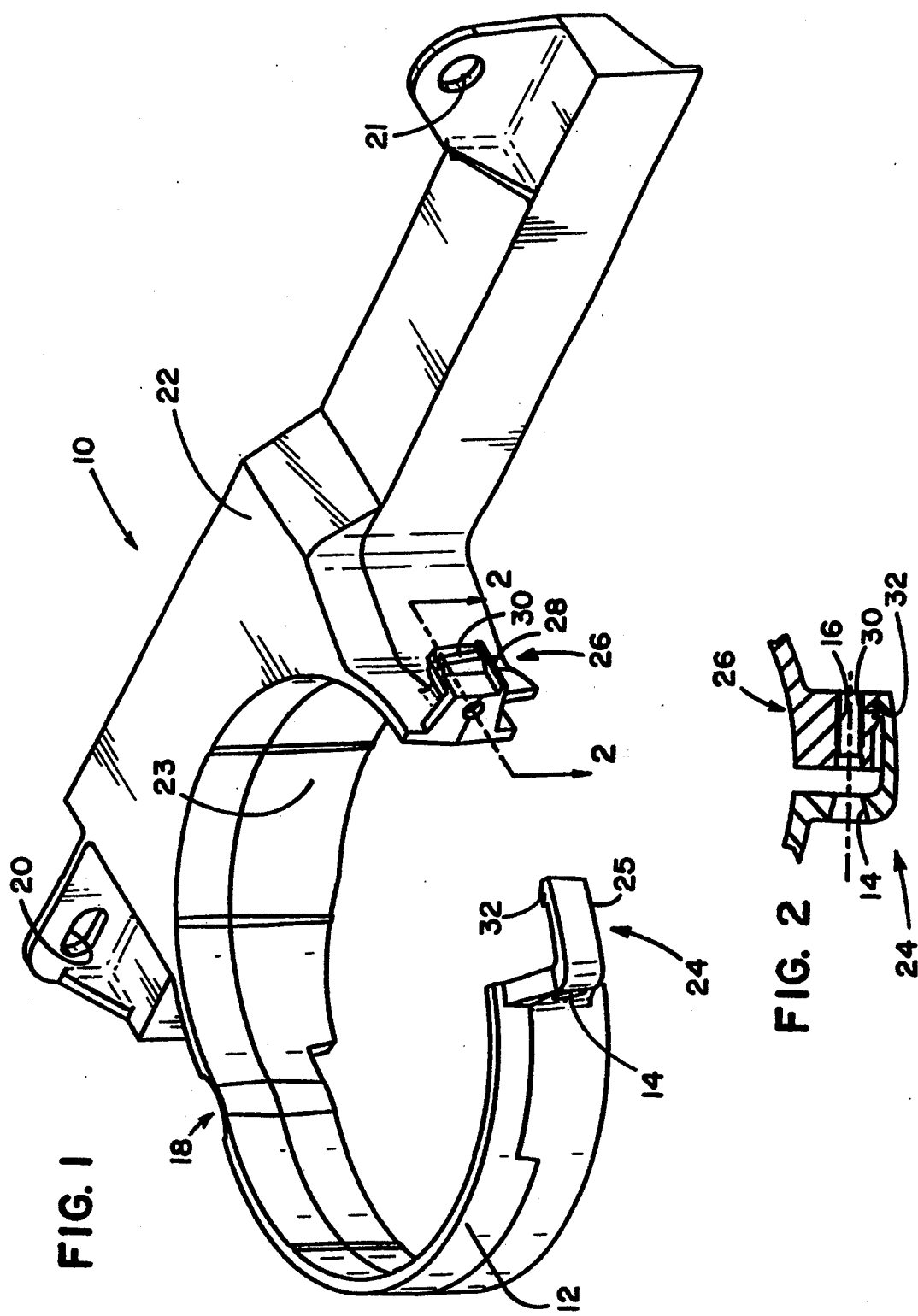

CANISTER BRACKET

TECHNICAL FIELD

The present invention is directed to a bracket for securing cylindrical objects to the engine compartment wall of a vehicle and is more particularly directed to a bracket for attaching an air conditioner receiver/dryer to a vehicle.

BACKGROUND ART

Modern assembly techniques are used to fabricate automobiles and other vehicles. Moving assembly line technology requires that component sub-assemblies be quickly and accurately located into the vehicle.

Air conditioning sub-systems include several structures which are typically mounted on a firewall or other interior surface within the engine compartment. In some mounting applications a cylindrical structure such as a receiver/dryer needs to be retained or placed into an approximate position prior to final positioning and clamping. The present canister bracket addresses this problem and facilitates the trial assembly of components and facilitates adjustment and securing of structures such as a receiver/dryer.

SUMMARY OF THE INVENTION

The canister bracket 10 includes a generally circular attachment band 12 integrally molded to a mounting base 22. One end of the attachment band 12 is connected to the mounting base 22 through an integrally molded hinge 18. The other end of the attachment band 12 terminates in a clasp 24 structure. The clasp 24 has a screw hole 14 associated with it which can retain or hold a self taping screw. The clasp 24 cooperates with a complimentary ratchet 26 structure formed on the mounting base 22. In use the assembler places a cylindrical object such as a receiver/dryer within the substantially circular aperture formed between the attachment band 12 and the mounting base 22. Next the assembler advances the clasp 24 toward the ratchet 26. When the teeth of the clasp 24 engage the teeth of the ratchet 26 the cylindrical object will be held loosely by the attachment band 12. A lip 28 formed proximate the ratchet teeth 30 prevents the attachment band from twisting and disengaging the clasp 24 and rachet 16 structures. For this reason a relatively heavy cylindrical object may be positioned and loosely held by the canister bracket 10 for trail assembly prior to final clamping.

BRIEF DESCRIPTION OF THE DRAWINGS

An illustrative canister bracket is shown in the drawings were identical reference numerals indicate identical structure throughout, and wherein:

FIG. 1 shows a perspective view of the canister bracket; and,

FIG. 2 show a detail cross-section of a portion of the canister bracket.

DESCRIPTION OF A PREFERRED EMBODIMENT

FIG. 1 shows a perspective view of the canister bracket 10. The canister bracket comprises an attachment band 12 coupled to a mounting base 22. The mounting base 22 has a semicircular or arcuate relief 23 molded therein to provide a support surface for the receiver/dryer. The attachment band 12 is connected with a "living" hinge 18 molded integrally with the mounting base 22 and attachment band 12. The terminal end of the attachment band 12 has a clasp 24 structure formed integrally with the attachment band 12. This clasp structure 24 includes a set of clasp teeth 32 and a screw hole 14.

The mounting base 22 has a rear surface molded to mate with a complimentary surface structure defined in the vehicle mounting wall. A ratchet structure 26 is molded into the mounting base proximate the terminal end of the attachment band 12. The ratchet structure 26 also includes a lower lip 28 or wall, and a screw receiving hole 16. In use the mounting base 22 will first be attached to the vehicle fire wall with screws placed through suitable mounting apertures 20 and 21. The receiver/dryer will be placed within the cylindrical relief 23 formed by the attachment band 12 and the mounting base 22. The assembler will next push the clasp 24 onto the ratchet 26 which will cause the ratchet teeth 30 to engage the clasp teeth 32. At this time the assembler my release the receiver dryer and it will not drop out of the canister bracket 10 because the lower edge or complimentary surface 25 of the claps 25 rests on the lip 28 formed on the ratchet 26 structure. After final positioning the assembler may insert a screw through the clearance screw hole 14 and engage the screw hole 16 which is formed in the ratchet 26 structure. By driving a screw into the assembly the receiver/dryer is securely grasped or clamped by the canister bracket 10.

What is claimed is:

1. A canister bracket for retaining a cylindrical structure comprising:

a mounting base (22);

an attachment band (12);

a hinge (18) connecting the attachment band (12) to the mounting base (22);

a clasp (24) structure formed at the terminal end of said attachment band (12);

said clasp structure having a complimentary surface (25);

said clasp (24) structure having a plurality of clasp teeth (32);

a ratchet (26) structure formed on said mounting base (22) proximate said clasp (24) structure;

said ratchet (26) structure having a lip (28) formed on said ratchet (26) structure for engaging said complimentary surface (25) formed on said clasp (24) structure;

said ratchet (26) structure having a plurality of ratchet teeth (30) for mating engagement with said clasp teeth (32), said ratchet structure being loosely engaged with said clasp teeth (32);

means for clamping said ratchet structure and said clasp structure, said clamping means including a clearance screw hole (14) on said clasp structure and a clearance screw hole (16) on said ratchet structure, said clasp structure and said ratchet structure being tightly engaged with each other by tightening a screw member in said clearance screw holes (14,16); and whereby, said complimentary surface abuts said lip when said ratchet teeth are pushed into engagement with said clasp teeth.

UNITED STATES PATENT AND TRADEMARK OFFICE
CERTIFICATE OF CORRECTION

PATENT NO. :     5,344,112

DATED     :     September 6, 1994

INVENTOR(S) :    Francis C. Peterson et al.

It is certified that error appears in the above-indentified patent and that said Letters Patent is hereby corrected as shown below: On the title page:

Item [75], under "Inventors", please delete "Wis.;", and insert therefor --Wis.,--

Item [73], under "Assignee", please delete "Ford Motor Company, Dearborn, Mich., and insert therefor --Ford Motor Company, Dearborn, Mich. and Phillips Plastics Corporation, Prescott, Wis.--

In column 1, line 53, before the word "identical", please delete the word "were", and insert therefor --where--

In column 1, line 57, please delete the word "show", and insert therefor --shows--

UNITED STATES PATENT AND TRADEMARK OFFICE
CERTIFICATE OF CORRECTION

PATENT NO. : 5,344,112
DATED : September 6, 1994
INVENTOR(S) : Francis C. Peterson et al.

It is certified that error appears in the above-indentified patent and that said Letters Patent is hereby corrected as shown below:

In column 1, line 49, please delete the word "trail", and insert therefor --trial--

In column 2, line 22, please delete the word "my", and insert therefor --may--

In column 2, line 22, please delete the words "receiver dryer", and insert therefor --receiver/dryer--

In column 2, line 24, before the word "rests", please delete "claps 25", and insert therefor --clasp 24--

In column 2, line 54, after the word "engaged", please insert --with said clasp structure by engaging said ratchet teeth (30)--

Signed and Sealed this

Fourth Day of April, 1995

*Attest:*

BRUCE LEHMAN

*Attesting Officer*     *Commissioner of Patents and Trademarks*